Figure 1:
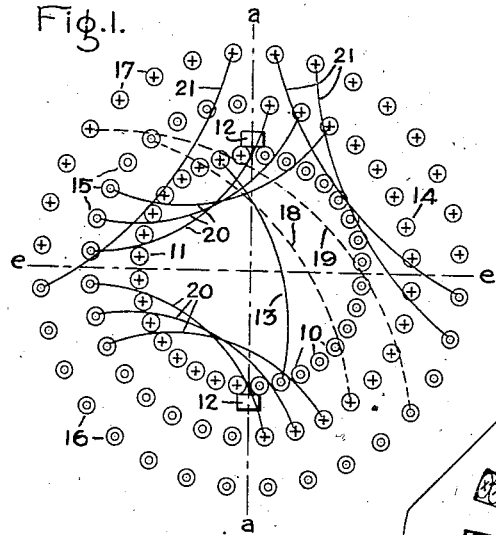

S. R. BERGMAN.
DYNAMO ELECTRIC MACHINE.
APPLICATION FILED AUG. 21, 1914.

1,173,090.

Patented Feb. 22, 1916.
2 SHEETS—SHEET 1.

Witnesses:
Marcus L. Byng.
Edmund Trojakowski.

Inventor:
Sven R. Bergman,
by Albert Davis
His Attorney

S. R. BERGMAN.
DYNAMO ELECTRIC MACHINE.
APPLICATION FILED AUG. 21, 1914.

1,173,090.

Patented Feb. 22, 1916.
2 SHEETS—SHEET 2.

Witnesses:
Marcus L. Byng
Edmund Trojakowski

Inventor:
Sven R. Bergman,
by Albert G. Davis
His Attorney.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

1,173,090.  Specification of Letters Patent.  Patented Feb. 22, 1916.

Application filed August 21, 1914. Serial No. 857,851.

*To all whom it may concern:*

Be it known that I, SVEN R. BERGMAN, a subject of the King of Sweden, residing at Lynn, county of Essex, State of Massachusetts, have invented certain new and useful Improvements in Dynamo-Electric Machines, of which the following is a specification.

My invention relates to direct current dynamo-electric machines, and more particularly to compensated direct current dynamo-electric machine.

More particularly the object of my invention is to provide an improved and novel direct current dynamo-electric machine having particularly desirable electrical characteristics, and possessing marked economic features of construction.

The present application is in part a continuation of my application filed June 9, 1909, Serial No. 501,050.

Broadly, the object of my present invention is to provide a novel and improved construction of compensated direct current dynamo-electric machine having particularly desirable electrical characteristics, and possessing marked economic features of construction.

Another object of my invention is to provide a direct current dynamo-electric machine in which the armature reaction may be completely neutralized and which can be produced in an economic and compact design at a considerably lower cost than present direct current machines of corresponding output.

Another object of my invention is to provide a compensated direct current dynamo-electric machine having a distributed compensating winding in which commutation difficulties are eliminated.

A further object of my invention is to provide a novel and improved arrangement of a distributed exciting winding in a direct current dynamo-electric machine for obtaining compound excitation.

Other objects of my invention will be apparent to those skilled in the art from the following specification and appended claims.

It is well understood in the art that where commutation conditions are severe, as in high speed generators, in motors which must operate over wide ranges of speed with weakened field, and in machines which have to endure heavy fluctuations in load, commutation can be improved by employing a compensating winding for neutralizing the armature reaction, and, in order to obtain the best results, that the compensating winding should be distributed so as to completely neutralize the armature reaction. It has heretofore been customary, in dynamo-electric machines provided with compensating windings, to use a concentrated form of exciting winding with definite poles, and so far as I am aware, no direct current dynamo-electric machine provided with a compensating winding and a distributed form of exciting winding has yet been constructed which is able to compete with the form of machine in which the exciting winding is concentrated. I am aware that it has been heretofore proposed to distribute the exciting winding, but with the arrangements proposed it has always been found that the construction was either more expensive or not as satisfactory as that of the type of machine employing a concentrated form of exciting winding. I have discovered, however, that by winding distributed compensating and exciting windings in a particular way, that is, by using compensating and exciting windings having the same pitch and a pitch which is substantially one-half the pitch of the armature winding, it is possible to very materially reduce the cost of a direct current dynamo-electric machine and at the same time to secure desirable electrical characteristics and to maintain a high efficiency and excellent operating characteristics.

My present invention in its complete form consists in a novel and improved arrangement of the windings of a direct current dynamo-electric machine in which completely distributed compensating and exciting windings having a coil pitch of substantially fifty (50) per cent. are employed in combination with an armature winding of the ordinary form having a coil pitch of substantially one hundred (100) per cent. Preferably, the compensating winding is designed to produce a magnetization of such strength as to overpower the armature reaction at all points and at all loads, thereby producing a commutating flux. In order that this commutating flux may be employed to the best advantage I prefer to provide definite commutating teeth on the inner periphery of the field magnet of the machine, thus insuring clean neutral commutating zones, and preferably I close the adjacent slot on each side of each commutating tooth with a non-magnetic wedge, while the other slots in the field magnet are closed with magnetic wedges. As explained in detail hereinafter, the exciting winding may furnish shunt or compound excitation, and in the limiting case may even furnish series excitation.

In carrying out my invention I provide an armature winding of substantially full or 100 per cent. pitch, and a distributed field magnet carrying compensating and exciting windings, the compensating and exciting windings being each a distributed lap winding of substantially half or 50 per cent. pitch. The field magnet has its magnetic material distributed around the armature to form a substantially uniform air gap, and its inner periphery has distributed slots in which are carried the compensating and exciting windings. The compensating and exciting windings are each uniform lap windings producing magnetizations on lines 90 electrical degrees apart in space, and are very advantageously composed of uniform overlapping coils interleaved to form mechanically a single winding. Each winding is further completely distributed over the inner periphery of the field magnet so that each field magnet slot contains a coil of each winding. As heretofore mentioned, the inner periphery of the field magnet is preferably provided with definite commutating teeth which are suitably excited by the compensating winding, and which are preferably separated from the adjacent tooth on each side thereof by a relatively wide slot closed with a non-magnetic wedge.

The novel features which I consider patentably characteristic of my invention are definitely indicated in the claims appended hereto.

Figure 2:
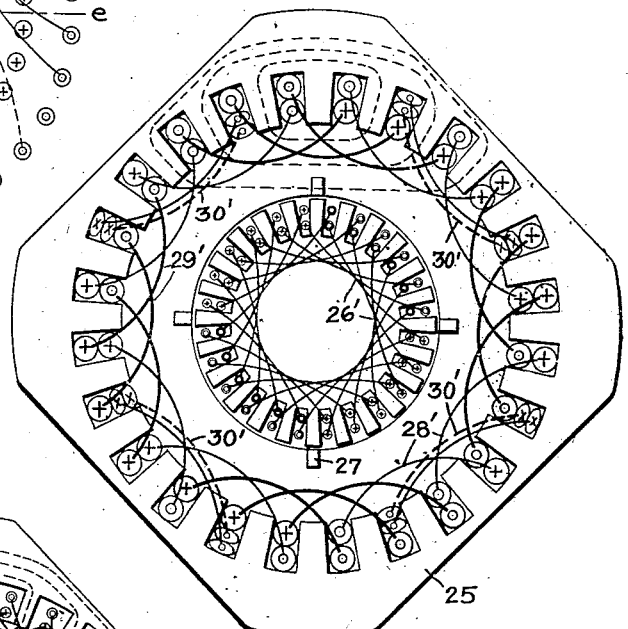
Figure 3:
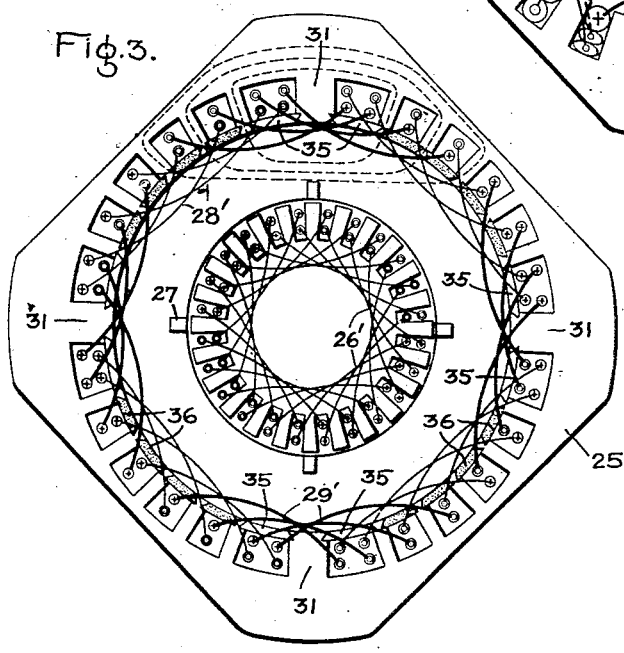
Figure 4:
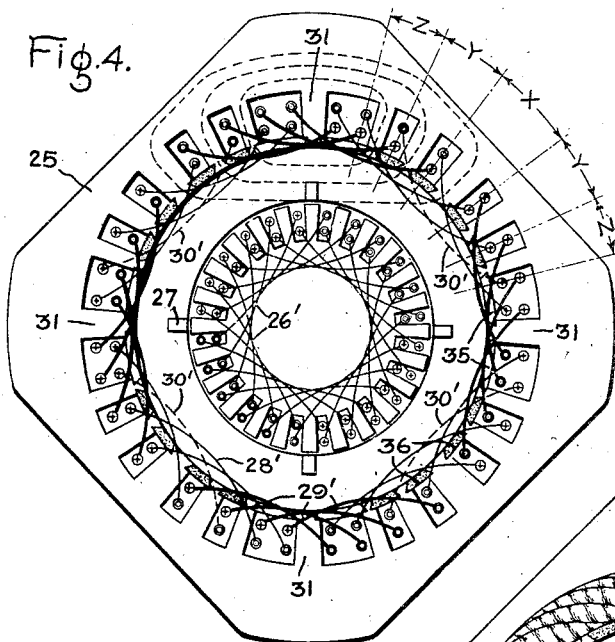
Figure 5:
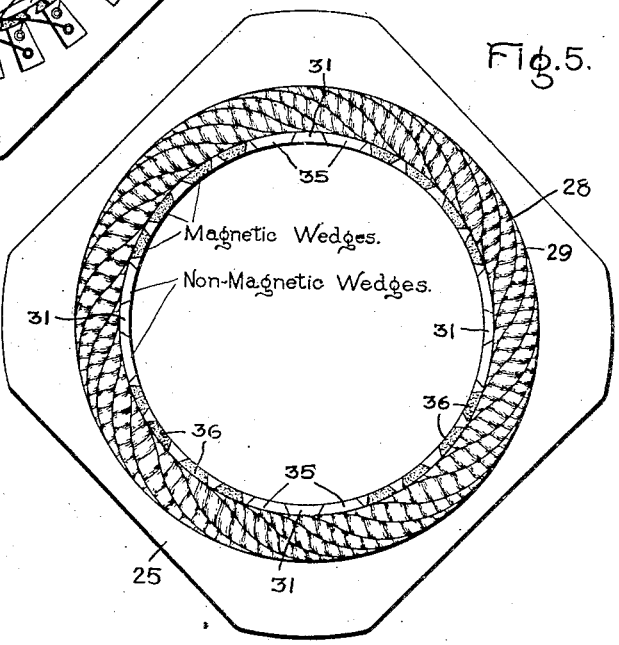
Figure 6:
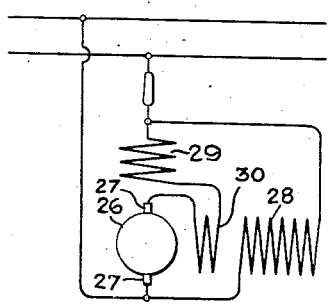
Figure 7:
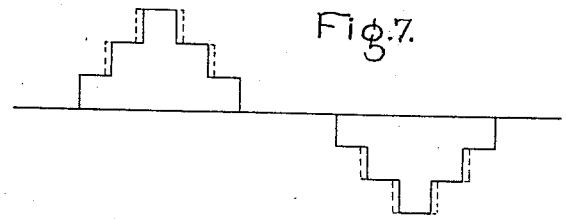

The novel features of my invention together with the construction and mode of operation of machines embodying these features will be best understood by reference to the following description taken in connection with the accompanying drawings, in which:

Figure 1 is an explanatory diagram illustrating the relations of the currents in the conductors of the various windings in a direct current dynamo-electric machine embodying my invention. Fig. 2 is a diagrammatic view of the current distribution in the conductors of the armature coils and of the coils of the compensating and exciting windings on the field magnet in a direct current dynamo-electric machine having compound excitation and embodying the features of my invention; Fig. 3 is a diagrammatic view, similar to that of Fig. 2, of a preferred embodiment of my invention in a direct current dynamo-electric machine having shunt excitation; Fig. 4 is a diagrammatic view, similar to that of Fig. 2, of a machine embodying my invention and having compound excitation and further illustrating certain modifications of the invention; Fig. 5 is particularly an end view of the field magnet member of the machine represented in Fig. 3 and generally of the machines represented in Figs. 2 and 4; Fig. 6 is a diagrammatic view of the circuit connections; and Fig. 7 is an explanatory diagram illustrating the flux distribution resulting from the type of exciting winding which the machine of my invention employs.

The novel and improved direct current dynamo-electric machine of my invention comprises in its complete form a commuted armature winding of substantially full-pitch, a substantially half-pitch compensating winding completely distributed about the armature winding and designed to produce a magnetization of such strength as to overpower the armature reaction at all points and at all loads, and hence preferably connected in series with the armature winding, and a substantially half-pitch completely distributed exciting winding arranged to produce a magnetization along an axis 90 electrical degrees spaced from the axis of magnetization produced by the armature and conpensating windings. Generally, the exciting winding is connected in shunt to the armature winding, but if it is desired to compound the machine a portion of the shunt exciting coils may be replaced by series coils. In the limiting case, the shunt exciting coils may be entirely replaced by series exciting coils, in which case a machine having straight series characteristics is obtained. My invention is, however, more particularly concerned with a machine having compound or shunt characteristics.

Referring to Fig. 1 of the drawings there is diagrammatically represented the conductors of the armature, compensating, and exciting windings of a two-pole machine. The inner circle represents the conductors of the armature winding, the middle circle represents the conductors of the compensating winding, and the outer circle represents the conductors of the exciting winding. Current distribution in the conductors is shown by means of the usual convention, in which crosses and circles applied to the conductors indicate, respectively, that the current is flowing away from or toward the observer. The two halves of the armature conductors between the brushes 12 carry currents of opposite direction. Thus one half, 10, of the armature conductors carry current in one direction, and the other half, 11, of the armature conductors carry current in the opposite direction. The armature winding thus produces a magnetization along the line $a$—$a$. The compensating winding must be so arranged that the current flowing in each conductor thereof is substantially equal and opposite in direction to the current flowing in the radially adjacent armature conductor. The compensating winding is thus most conveniently connected in series with the armature winding. It will thus be readily seen that the current in one half, 14, of the compensating conductors flows in a direction opposite to that of the current in the armature conductors 10, and the same relation is true of the other half, 15, of the compensating conductors and the armature conductors 11. The compensating winding, accordingly, produces a magnetization along the line $a$—$a$, but of opposite direction or polarity to that produced by the armature winding. The exciting winding is to produce a magnetization along the line $e$—$e$, at 90 electrical degrees to the line of magnetization $a$—$a$ produced by the armature and compensating windings. The exciting winding is uniformly distributed and one half, 16, of the conductors of this winding carry current flowing in one direction, while the other half, 17, of the conductors carry current flowing in the opposite direction.

The armature winding is a full-pitch winding, as clearly indicated by the end connections 13. The compensating and exciting windings would most naturally be laid out as full-pitch windings, in which event the end connections would be represented by the dotted lines 18 and 19 respectively. The compensating winding is in fact ordinarily laid out as an exact counterpart of the armature winding, whose reaction it is to neutralize. Where, therefore, the armature winding is a full-pitch winding the compensating winding would most obviously be designed as a full-pitch winding. I have discovered, however, that a fifty (50) per cent. pitch winding can be employed for the compensating winding and for the exciting winding with a full-pitch armature winding, and exhaustive experiments have proved that the 50 per cent. pitch windings give, electrically, the same results as full-pitch windings. The end connections of the 50 per cent. pitch compensating and exciting windings are indicated at 20 and 21, respectively, in Fig. 1, and it will be readily apparent that a very considerable saving in copper is effected by being able to use a 50 per cent. in place of a 100 per cent. pitch winding. It will, accordingly, be obvious that the armature reaction of a full-pitch armature winding is completely neutralized by a half-pitch compensating winding, and further that the exciting field of the motor is produced by a completely distributed winding of half-pitch.

Fig. 1 is purely a diagrammatic illustration of the current relations in the conductors of the three windings of the compensated direct current machine to which my invention relates, and shows that the requisite conditions can be fulfilled by the types of windings described. In Figs. 2, 3, 4 and 5, I show how to arrange the windings in the practical application of my invention to provide commercially suitable forms of winding. I have illustrated four-pole machines in Figs. 2, 3, 4 and 5, but it will, of course, be understood that the discussion of these figures is applicable to machines having any desired number of poles.

The compensating and exciting windings, in accordance with my invention, are ordinary uniform lap windings, as is diagrammatically indicated in Figs. 2, 3 and 4, and more clearly shown in Fig. 5 of the drawings. Each winding is composed of uniform overlapping coils interleaved so that the two windings form mechanically a single two-layer winding. This particular type of winding, that is a two-layer lap winding having uniform overlapping and interleaved coils, together with the 50 per cent. pitch which I give these windings in my improved machine, enables me to provide a field magnet structure of decidedly compact and economic construction, and one possessing distinct advantages over the field magnet structure in any present type of design of direct current dynamo-electric machine with which I am familiar.

Fig. 6 of the drawings represents diagrammatically the circuit connections and relations of the various windings in a compensated direct current dynamo-electric machine. The machine represented in this figure is bi-polar, and has an armature member 26, commutator brushes 27, a shunt exciting winding 28, a series exciting winding 30, and a compensating winding 29. The series exciting winding 30 may obviously be omitted, as when straight shunt characteristics are desired, and in any case the degree of compounding, and hence the amount of series excitation, may be proportioned as desired. The various windings in my novel and improved construction of compensated direct current dynamo-electric machine are related to one another and are electrically connected in the manner indicated in Fig. 6.

Figs. 2, 3 and 4 of the drawings diagrammatically represent dynamo-electric machines embodying the novel features of my invention. The machines illustrated in these figures differ from one another in certain details which will be noted hereinafter. For the present explanation of my invention these machines may be considered together. Each of the machines represented in these figures is a four-pole machine. The field magnet 25 of each machine has a slotted annular inner periphery so as to form with the armature a substantially uniform area. The field magnet thus has its magnetic material distributed around the armature to form a substantially uniform air gap and is provided with distributed slots on its inner periphery for the compensating and exciting windings.

The coils 29' of the compensating winding and the coils 28' of the exciting winding are carried in the slots of the field magnet. The coils of the exciting winding are shown in light lines, and the coils of the compensating winding are shown in heavy lines. The coils of both windings are uniform in shape and dimensions, but are wound of wire of different cross-section, since the coils of the compensating winding are connected in series with the armature winding, while the coils of the exciting winding are, for the most part, connected in shunt to the armature winding, as diagrammatically shown in Fig. 6 of the drawings. It will be seen that both compensating and exciting windings are completely distributed so that each slot of the field magnet contains coils of both windings. The compensating and exciting windings are uniform lap windings and the uniformly overlapping coils of the two windings are interleaved to form mechanically a single winding, as clearly indicated in Fig. 5 of the drawings. Every coil of both the compensating and exciting windings has one side positioned in the bottom of a slot and the other side positioned in the top of a slot, so that every coil is included in both the top and bottom layers of the mechanically single two-layer field winding. Thus the compensating winding, or the exciting winding, considered by itself is a two-layer winding, since the conductors of each winding are arranged in two concentric layers, and the two windings taken together form mechanically a single winding whose coils are also arranged in two concentric layers.

The coils 28' of the exciting winding and the coils 29' of the compensating winding have in accordance with my invention a coil pitch of 50 per cent. This coil pitch results in a material shortening of the end connections of the coils and a corresponding economy in the material of the conductors. The armature winding is a full-pitch winding. In Figs. 2, 3 and 4 of the drawings I have diagrammatically illustrated an armature having a two-conductor deep slot in which are suitably carried the armature coils 26' of 100 per cent pitch. Brushes 27 bear upon a coöperating commutator suitably connected in the usual manner to the coils of the armature winding. It is of course possible to depart slightly from the exact full or half pitch winding, as the case may be, and as would be necessary where the number of slots is uneven, such for example as in a four-pole machine having 29 slots in the periphery of the armature core. In this particular case, it would not be possible to employ an exact full-pitch armature winding, since 29 is not divisible by four, and it is, therefore, necessary to employ a pitch which is substantially but not exactly full pitch. Thus while a machine operates best with a full pitch winding it is necessary in practice to depart from the exact full pitch to the extent necessary to take care of uneven slot numbers. I have, accordingly, in this specification and in the appended claims designated the armature winding as a substantially full pitch winding and the compensating winding and the exciting winding as substantially 50 per cent. or half pitch windings.

The current distribution in the conductors of the various coils is shown in Figs. 2, 3 and 4 of the drawings in the same manner as in Fig. 1. By observing the direction of current flow in the conductors of the compensating winding 29', as indicated by crosses and dots, it will be seen that four poles are produced on the vertical and horizontal diameters. It will further be seen that the exciting winding 28' similarly produces four poles which are displaced 45 circular or 90 electrical degrees in space from the poles of the compensating winding. Thus the compensating and exciting windings are arranged somewhat like the two phases of the winding of a two-phase induction motor, except that each of the former windings is completely distributed instead of being distributed over only 50 per cent. of the periphery, as is common in a two-phase induction motor. Furthermore, the coils of both compensating and exciting windings are, in accordance with my present invention, of only 50 per cent. pitch.

It will be seen that while the inner periphery of the field magnet is circular the outer periphery is a square polygon, and that the poles produced by the exciting winding occur at points on the inner periphery opposite the centers of the sides of the polygon formed by the external periphery. This configuration of the field magnet results in using the magnetic material of the field magnet very efficiently, as is shown by a consideration of the flux distribution. It will be evident that the flux distribution produced by the exciting winding is as shown by dotted lines at the upper corners of Figs. 2, 3 and 4. As appears in these figures, the maximum flux occurs at those points of the field magnet where the cross-section of magnetic material is greatest. The magnetizing effect of the compensating winding is opposed by that of the armature winding, so that flux displacement due to the compensating winding need not be considered. This advantageous configuration of the field magnet is claimed in an application divided from the parent application and filed August 17, 1914, Serial No. 857,083. It will further be observed that the corners of the outer periphery of the field magnet are slightly cut away to give each corner an arcual configuration. This particular configuration of the field magnet facilitates the assembling of the field magnet in the frame of the motor, which is generally circular, and is disclosed in an application filed by me Jan. 12, 1911, Serial No. 602,205.

The uniform lap winding which characterizes my novel distributed exciting winding produces a distinct advantage in the shape of the flux distribution at each pole face. The full line diagram of Fig. 7 shows the general character of the flux distribution through an electrical angle of 360 degrees resulting from the use of a distributed uniform lap winding. It will be observed that at the ends of the pole face the flux is a minimum and increases generally as a sine curve to a maximum value at the center of the pole face. Thus the flux density in the neighborhood of the neutral commutating zones is relatively small, and the commutator brushes can be moved relatively to the poles a considerable amount before the flux density in the commutating zone becomes objectionably large and thus without danger of disastrous results, such as a flashing over at the commutator brushes. Where a concentrated type of exciting winding is employed the flux density is substantially uniform over the entire pole face, and rises from a zero value to a maximum value substantially at the same point on the pole face. A so-called concentrated winding does not, therefore, produce a gradual increase of the flux density toward the center of the pole face with its accompanying advantages, as is the case where a lap winding is employed.

It will be observed that the character of the compensating and of the exciting windings which I employ in my improved machine insures an effective resultant magnetization at all points of the inner periphery of the field magnet. Since, the armature reaction can be completely neutralized or compensated the machine may be built with a stronger armature, that is, an armature having greater ampere turns and hence greater armature reaction. Again, it is possible to satisfactorily work the machine with a very weak field, and in the case of a motor wide speed adjustment may thus be obtained. I have found that a speed adjustment of 10 to 1 can be very satisfactorily obtained in motors embodying the features of my invention, whereas in any present construction of direct current machines of which I have knowledge, the practical limit is in the neighborhood of 4 or 5 to 1.

In order to obtain sparkless commutation it is necessary that the strength of the compensating winding be greater than the strength of the armature winding, since the compensating winding should produce a resultant flux in the commutating zone, which flux is needed in order to reverse the electromotive force of self-induction in the coil undergoing commutation. The ratio of the strength of the compensating winding to the strength of the armature winding is a measure of the degree of compensation, and when this ratio is greater than unity the machine is over-compensated. When a machine is over-compensated the compensating winding not only neutralizes the armature reaction but overpowers it, so that the necessary commutating flux is produced.

I have throughout this specification and the appended claims used the word over-power in connection with the compensating winding to designate a compensating winding of such strength as to completely neutralize the armature reaction and to produce a commutating flux. I have found that the overcompensation may vary from 1 per cent. to 25 per cent., depending upon the amount of self-induction in the armature, the rule being that the larger the self-induction of the armature the larger should be the overcompensation.

I have found that commutation in the compensated direct current dynamo-electric machine of my invention is decidedly improved by providing a clean neutral commutating zone. To this end, I prefer to provide on the inner periphery of the field magnet 25, definite commutating teeth 31, as indicated in Figs. 3, 4 and 5 of the drawings. One commutating tooth per pole is provided, and the width of the commutating tooth should generally be such as to cover two armature slots and the intermediate tooth, but it will of course be understood that this rule is approximate and may be departed from. The commutating teeth correspond in structure to the other teeth of the field magnet, and are definitely isolated from such other teeth by the omission of one tooth on each side of each commutating tooth. The adjacent slot on each side of each commutating tooth is closed with a non-magnetic wedge 35 while the other slots in the field magnet are closed with magnetic wedges 36. The provision of an isolated commutating tooth of this character and the arrangement of non-magnetic and magnetic wedges as described provides a clean neutral, and exhaustive experiments prove it most desirable in order to obtain stable operating conditions. If the adjacent tooth on each side of each commutating tooth is not cut away to provide a definite commutating zone, the path of low reluctance through such adjacent tooth creates a local flux interlinked with the coil undergoing commutation, and there is consequently produced in such coil an objectionable reactance voltage. The omission of the teeth as described eliminates the magnetic path of low reluctance for this local flux, and thus, accordingly, improves the commutation of the machine, and, as experiments have shown, insures stability. The non-magnetic wedges on either side of the commutating tooth further serve to definitely isolate the tooth magnetically.

In Fig. 3 of the drawings the exciting winding is a shunt winding, and the machine accordingly has straight shunt characteristics. Where series coils are employed to produce a compound excitation certain of the coils of the shunt exciting winding may be reduced in size, as indicated in Fig. 2 of the drawings, and series coils 30' placed in the same slots with such reduced shunt coils. It will of course be understood that any desired degree of compounding may be employed, and one or more entire shunt coils may be replaced by a corresponding number of series coils. In Fig. 2 of the drawings one-half of two shunt coils per pair of poles have been replaced by series coils, the series coils 30' being represented by dotted lines in this figure. In every case, where a portion of the shunt winding is replaced by a corresponding portion of a series winding all of the slots will be filled, no matter what the degree of compounding is. The series coils of the exciting winding must produce a resultant magnetization along the exciting axis. In the machine of Fig. 2, the number of field magnet slots is such that the series exciting coils can be placed in slots concentric with the exciting axis. In the machine of Fig. 4 the number of field magnet slots is such that this can not be done, and in order that the resultant magnetization of the series coils may be in the exciting axis the series coils are arranged as indicated in Fig. 4 of the drawings. In the machine of this figure one entire shunt coil per pole is replaced by a series coil, and the series coils are indicated by dotted lines. It will be observed that each series coil is unsymmetrically arranged with respect to the exciting axis, but that two adjacent series coils are symmetrically arranged with respect to the axis of the armature magnetization. That is to say, any two adjacent series coils are symmetrically positioned with respect to the commutating tooth between such coils, and hence the resultant magnetization produced by these two series coils is in line with the exciting axis.

It is sometimes advantageous to provide a graded spacing of the slots in the inner periphery of the field magnet so that the slots are not evenly distributed, as will be best seen by reference to Fig. 4 of the drawings. The angular displacement between the centers of the slots varies, and it will be noted that the greatest angular displacement occurs at the center of the pole face, and that the angular displacement diminishes toward the end of the pole face. The angular displacement between the centers of the slots is indicated by radial lines in Fig. 4, where it will be observed that the angle $x$ is greater than the angles $y$, and angle $y$ greater than angles $z$. Since the slot widths are uniform, the tooth widths will be graded where the angular distance between the centers of the slots varies, and there will be a wide tooth located in the center of the pole face with teeth decreasing in width on each side thereof. A graded spacing is not practical in large machines because of the non-uniformity of the coils, and I, accordingly, prefer generally to have an equal spacing of the field magnet slots. In those cases where it is advisable to obtain slightly more flux through the machine a graded spacing is of advantage. The effect of the graded spacing of the slots upon the exciting flux is shown in dotted lines in Fig. 7. The increased width of the center tooth of the pole face results in a widening of the maximum value of the flux form, whereby there is a resultant increase in the total flux of the machine.

The armature reaction in a machine embodying the novel features of my invention is completely neutralized and preferably overpowered at every point along the armature circumference by the magnetization produced by the distributed compensating winding, and consequently there is no local field distortion as in the case of machines with definite interpoles. Interpoles do not prevent local distortion of the field underneath the pole arc, which distortion causes an increase of the core loss, and furthermore, causes hunting at sudden overloads which is a decided disadvantage. Again, by employing distributed stator windings the air gap of the machine may be chosen only with reference to mechanical requirements, and can, therefore, be reduced to the same size as in the induction motor.

Aside from possessing decided electrical advantages my improved construction of machine is a most decided advance in the mechanical construction of direct current dynamo-electric machines. The use of 50 per cent. pitch in both the compensating and exciting windings results in a very marked saving in copper, since the end connections are materially shortened. Furthermore, the uniform lap windings of 50 per cent. pitch become beautifully symmetrical since the coils of each winding do not cross too large an arc and can therefore be overlapped and interleaved to form mechanically a single winding, and at the same time the magnetic field does not suffer in intensity. Again, with the exciting winding wound as a uniform lap winding a decided economy in the magnetic material of the field magnet is possible, since the field magnet has an approximately polygonal outer periphery, and the exciting winding is so arranged that the maximum flux passes through those parts of the field magnet where the cross section of magnetic material is greatest. The new machine has smaller over-all dimensions and smaller weight than machines constructed in accordance with the present direct current machine practice. I have found that a saving of at least one-third in the present weight of direct current machines can be effected by the use of the novel features of my invention. In fact, machines of my invention are of the same size and weight as induction motors of the same horsepower rating.

I do not claim as my invention a distributed compensating winding or a distributed exciting winding, since I am well aware that such windings have been proposed in the so-called Deri motors. I consider my present invention to reside in the novel and particularly advantageous relation between the pitch of the armature winding and the pitch of the compensating winding and also the pitch of the exciting winding, which, as above explained, renders it possible to obtain marked economies in the construction of a compensated direct current machine. Again, I consider that the particular type of distributed winding, that is, a uniform lap winding, which I employ for both the compensating and exciting windings produces a marked advance in compensated direct current dynamo-electric machine construction, both on account of the peculiarly satisfactory flux distribution produced by this character of exciting winding, and on account of the economic and symmetrical form that such a type of winding can take in the slots of the field magnet.

Another important and decidedly advantageous characteristic of my novel compensated direct current dynamo-electric machine is that the field circuit can be opened without occasioning the consequent destructive and dangerous disturbances which ordinarily accompany the opening of the field circuit in the present commercial types of direct current machines. When the field circuit of a motor embodying my present invention is opened the speed of the motor will not increase, and hence the motor will not run away. Due to the presence of the completely distributed compensating winding, the armature reaction is neutralized at every point, and hence when the field circuit switch is opened there exists no flux, and accordingly no motor torque, and therefore the motor comes to rest. Experiments have proved that the machine will come to rest whether running in one or the other direction.

A motor embodying my invention further possesses the advantageous characteristic that its direction of rotation can be conveniently reversed by merely reversing the current flow in the field circuit. When the current in the field circuit is reversed the machine will draw a considerable amount of current from the line, and for this reason it is desirable to use a current limiting resistance in series with the armature circuit during reversal. This is not necessary, however, in small motors, which may be reversed simply by a field reversing switch.

I have explained my invention by illustrating and describing a certain specific embodiment thereof, but it will be readily understood by those skilled in the art that the invention may be embodied in many other forms than that shown and described. I, accordingly, do not wish to be restricted to the particular form and construction disclosed herein by way of example for the purpose of setting forth my invention in accordance with the patent statutes. The terms of the appended claims are, therefore, not restricted to the precise structure disclosed but are intended to cover all changes and modifications within the spirit and scope of my invention.

What I claim as new and desire to secure by Letters Patent of the United States, is,—

1. In a direct current dynamo-electric machine, a substantially full-pitch commuted armature winding, a field magnet having its magnetic material distributed around the armature winding to form a substantially uniform air-gap and slotted on its inner periphery and an exciting winding and a compensating winding carried in the field magnet slots, the exciting winding and the compensating winding each being a substantially fifty per cent. pitch two-layer lap-winding completely distributed over the inner periphery of the field magnet.

2. A direct current dynamo-electric machine comprising in combination a substantially full pitch commuted armature winding, a field magnet having a plurality of distributed slots per pole, and a two-layer exciting winding and a two-layer compensating winding each composed of uniform coils of substantially fifty per cent. pitch carried in the slots in said field magnet.

3. A direct current dynamo-electric machine comprising in combination a substantially full pitch commuted armature winding, a field magnet having a plurality of distributed slots per pole, and a two-layer exciting winding and a two-layer compensating winding each composed of uniform coils of substantially fifty per cent. pitch carried in the slots in said field magnet and interleaved to form mechanically a single winding.

4. In a direct current dynamo-electric machine, a substantially full-pitch commuted armature winding, a field magnet having its magnetic material distributed around the armature winding to form a substantially uniform air-gap and slotted on its inner periphery, and a completely distributed exciting winding and a completely distributed compensating winding each of substantially fifty per cent. pitch carried in the field magnet slots, said exciting winding and said compensating winding being each a two-layer winding composed of uniform overlapping coils interleaved so that the two windings form mechanically a single two-layer winding.

5. A direct current dynamo-electric machine comprising in combination a commuted armature winding, a field magnet having a plurality of distributed slots and definite commutating teeth, a winding carried in the field magnet slots, non-magnetic material closing the adjacent slots on each side of each commutating tooth, and magnetic material closing the other slots in said field magnet.

6. A direct current dynamo-electric machine comprising in combination a commuted armature winding, a field magnet having a plurality of distributed slots and a definite commutating tooth per pole, each commutating tooth being separated from the adjacent tooth on each side thereof by a relatively wide slot, a winding carried in the field magnet slots, non-magnetic means closing the relatively wide slots on each side of each commutating tooth, and magnetic means closing the distributed slots in the field magnet.

7. In a direct current dynamo-electric machine, a commuted armature winding, a field magnet having its magnetic material distributed around the armature winding to form a substantially uniform air-gap, the inner periphery of said field magnet being slotted and having definite commutating teeth, a compensating winding carried in the field magnet slots and completely distributed over the inner periphery of the field magnet and adapted to produce a commutating flux, non-magnetic wedges closing the adjacent slot on each side of each commutating tooth, and magnetic wedges closing each of the other slots.

8. In a direct current dynamo-electric machine, a commuted armature winding, a field magnet having its magnetic material distributed around the armature winding to form a substantially uniform air-gap, the inner periphery of said field magnet being slotted and having definite commutating teeth separated from the adjacent tooth on each side thereof by a relatively wide slot, a compensating winding carried in the field magnet slots and completely distributed over the inner periphery of the field magnet and adapted to overpower the armature reaction thereby producing a commutating flux, non-magnetic wedges closing each of said wide slots, and magnetic wedges closing each of the other slots.

9. In a direct current dynamo-electric machine, a commuted armature winding, a field magnet having a plurality of distributed slots and definite commutating teeth separated from the adjacent tooth on each side thereof by a relatively wide slot, a winding carried in the field magnet slots, non-magnetic wedges closing each of said wide slots, and magnetic wedges closing each of the other slots.

10. In a direct current dynamo-electric machine, a substantially full-pitch commuted armature winding, a field magnet having its magnetic material distributed around the armature winding to form a substantially uniform air-gap, the inner periphery of said field magnet being slotted and having a definite commutating tooth per pole, an exciting winding of substantially fifty per cent. pitch carried in the field magnet slots and completely distributed over the inner periphery of the field magnet and connected in shunt to the armature winding, a compensating winding of substantially fifty per cent. pitch carried in the field magnet slots and completely distributed over the inner periphery of the field magnet and designed to overpower the armature reaction and to produce a commutating flux, non-magnetic wedges closing the adjacent slots on each side of each commutating tooth, and magnetic wedges closing each of the other slots.

11. In a dynamo-electric machine, an armature provided with a commutator, a field magnet having its magnetic material distributed around the armature to form a substantially uniform air-gap and slotted on its inner periphery, a field winding connected in shunt to the armature and a compensating winding connected in series with the armature, both carried in the field magnet slots and composed of uniform overlapping coils interleaved so that the two windings form mechanically a single winding, certain of the shunt field coils being reduced in size, and field coils connected in series with the armature occupying the same slots with said reduced shunt coils.

12. A direct current dynamo-electric machine comprising in combination a commuted armature winding, a field magnet having a plurality of distributed slots, a field winding connected in shunt to the armature winding and carried in the slots in said field magnet, certain of the coils of said shunt field winding being reduced in size, and coils connected in series with said armature winding and occupying the same slots with the reduced shunt coils.

13. A direct current dynamo-electric machine comprising in combination a commuted armature winding, a field magnet having a plurality of distributed slots, and an exciting winding carried in the slots of said field magnet, said exciting winding being composed of coils connected in shunt relation to the armature winding and of one coil per pole connected in series relation to the armature winding, said coils connected in series relation to the armature winding being so positioned that each coil is unsymmetrically arranged with respect to the exciting axis and so that any two adjacent coils are symmetrically arranged with respect to the intermediate axis of the armature magnetization.

In witness whereof, I have hereunto set my hand this 15th day of August, 1914.

SVEN R. BERGMAN.

Witnesses:
BENJAMIN B. HULL,
HELEN ORFORD.

---

It is hereby certified that in Letters Patent No. 1,173,090, granted February 22, 1916, upon the application of Sven R. Bergman, of Lynn, Massachusetts, for an improvement in "Dynamo-Electric Machines," errors appear in the printed specification requiring correction as follows: Page 1, strike out line 12 and insert the words *dynamo-electric machines having compound or shunt characteristics.*; same page, lines 25–28, strike out the words "having particularly desirable electrical characteristics, and possessing marked economic features of construction."; and line 25, after the word "machine" insert a period; same page, transfer lines 19–25 to follow the paragraph ending with line 12 as now numbered; and that the said Letters Patent should be read with these corrections therein that the same may conform to the record of the case in the Patent Office.

Signed and sealed this 18th day of April, A. D., 1916.

[SEAL.]

R. F. WHITEHEAD,
*Acting Commissioner of Patents.*

Cl. 171—228.